United States Patent [19]
Mellor

[11] 3,710,454
[45] Jan. 16, 1973

[54] PORTABLE APPARATUS FOR OPERATING OR SIMULATING OPERATION OF ARTIFICIAL KIDNEYS OR THE LIKE

[76] Inventor: Eli K. Mellor, 305 Andover Drive, Burbank, Calif. 91504

[22] Filed: Feb. 22, 1971

[21] Appl. No.: 117,559

[52] U.S. Cl. ................................................. 35/17
[51] Int. Cl. .......................................... G09b 23/28
[58] Field of Search ............... 35/17, 51, 26; 210/321

[56] References Cited

UNITED STATES PATENTS

| | | | |
|---|---|---|---|
| 2,193,597 | 3/1940 | Knopf | 35/26 |
| 2,945,304 | 7/1960 | Niiranen | 35/17 |
| 3,020,652 | 2/1962 | Ferrari | 35/17 |
| 3,027,655 | 4/1962 | Alderson | 35/17 |
| 3,483,867 | 12/1969 | Markovitz | 210/321 X |
| 3,508,662 | 4/1970 | Miller | 210/321 |
| 3,529,363 | 9/1970 | Versaci | 35/17 |
| 3,535,798 | 10/1970 | Turman | 35/51 |

Primary Examiner—Harland S. Skogquist
Attorney—White, Haefliger & Bachand

[57] ABSTRACT

Portable apparatus for operating or simulating the operation of artificial kidneys comprises:

a. a portable container adapted to be opened and closed, b. an artificial kidney type device carried by the container, and c. a support removable from the opened container to be carried by a patient, and transparent tubing on the support for passing liquid selected from the group consisting of blood and artificial blood.

11 Claims, 4 Drawing Figures

PATENTED JAN 16 1973
3,710,454
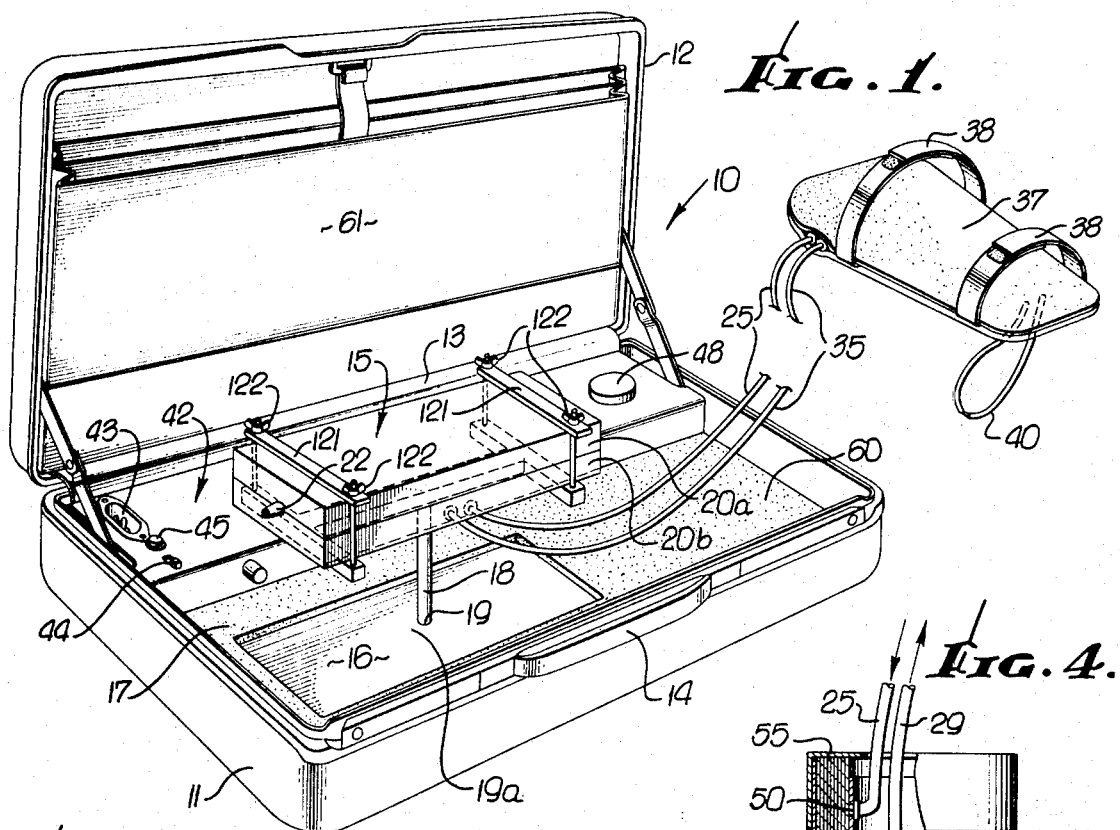
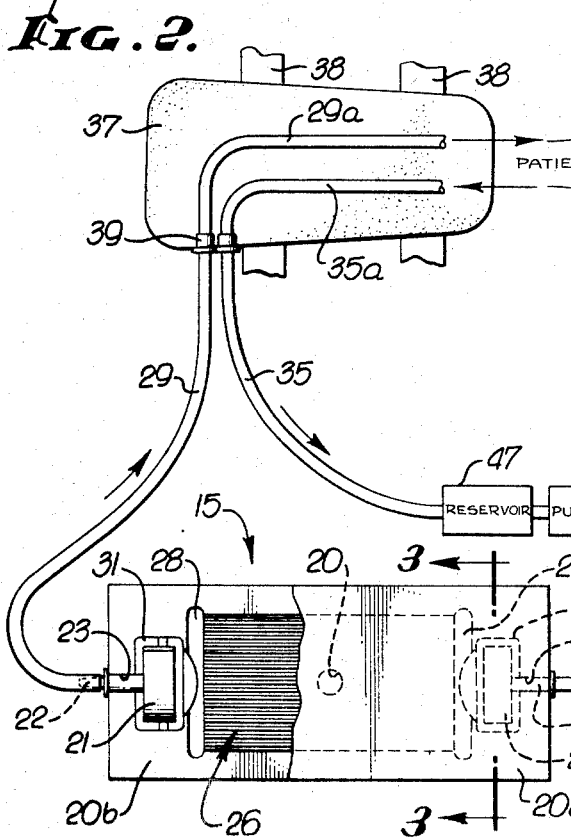
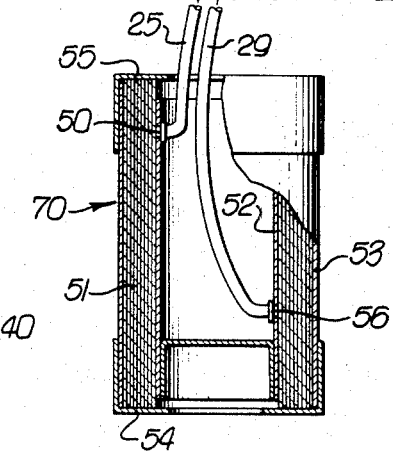
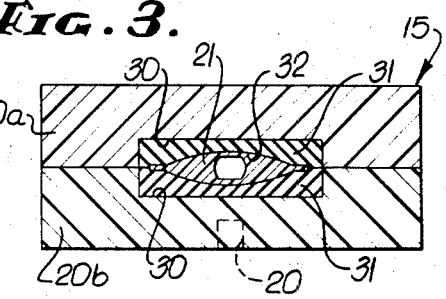
INVENTOR.
ELI K. MELLOR
BY
White, Haefliger & Bachand
ATTORNEYS.

PORTABLE APPARATUS FOR OPERATING OR SIMULATING OPERATION OF ARTIFICIAL KIDNEYS OR THE LIKE

BACKGROUND OF THE INVENTION

This invention relates generally to training of users of artificial kidneys, and more particularly concerns portable apparatus for operating or simulating the operation of artificial kidneys or the like.

When a patient is to be introduced to the use of artificial kidney or dialysis apparatus, a considerable training period is required. Such training is costly and may require extended non-productive use of the expensive equipment, which might otherwise be productively employed. There is, accordingly, need for simple, inexpensive equipment by means of which a prospective user may be thoroughly trained prior to his employment of the actual dialysis equipment. There is also need for portable easily usable dialysis equipment, so that patients need not return at fixed intervals to a hospital or other center for treatment.

SUMMARY OF THE INVENTION

It is a major object of the invention to provide portable apparatus for operating or simulating the operation of artificial kidneys, or the like, and characterized as meeting the above needs.

Basically, the apparatus comprises, in combination, a portable container adapted to be opened and closed; an artificial kidney type device carried by the container; and a support removable from the opened container to be carried by a patient (as for example on the arm), and transparent tubing on the support for passing liquid such as artificial or actual blood. As will be seen, a pump may be carried by the container in communication with the "dializing" device and tubing, for maintaining circulation of the liquid between these elements. Also, the container may include a receptacle to store the device, pump and tubing, and a closable cover, there being a handle on the container for portability of the equipment.

Further objects and advantages include the provision of the support in the form of a pliant pad with means to connect same to the patient's arm; the provision of a standard in the container for removably supporting the dialysis device in the form of a Kiil unit with predetermined horizontal orientation; the provision of a reservoir in the container for the liquid, and a housing for both the reservoir and pump; the advantageous construction of the artificial Kiil unit to be described; and the adaptation of the equipment to use with a so called "coil" unit, as will be described.

These and other objects and advantages of the invention, as well as the details of an illustrative embodiment, will be more fully understood from the following description and drawings, in which:

DRAWING DESCRIPTION

FIG. 1 is a perspective showing of equipment incorporating the invention;

FIG. 2 is a plan view showing certain details of the FIG. 1 equipment, in use;

FIG. 3 is a section taken on line 3—3 of FIG. 2; and

FIG. 4 is a vertical section taken through an alternate artificial kidney.

DETAILED DESCRIPTION

In FIG. 1 a portable container adapted to be opened and closed may take the form of a carrying case 10 having a main receptacle section 11 and cover section 12, these being hinge connected at 13 as shown. A handle 14 on the case adapts it for portability.

Normally contained within the case is an artificial kidney, as for example is shown at 15. During transportation of the case the kidney may be conveniently received or fitted within the rectangular opening 16 formed by a cushioning layer 17 which may consist of soft plastic material. During use of the kidney as shown in FIG. 1, a standard such as rod 18 may be removably inserted in an opening 19 in the base 19a of section 11 to stand vertically, and the kidney block 15 may be removably supported on the upper terminal of the rod. For this purpose, a recess 20 may be centrally provided in the underside of the kidney block to receive the rod upper terminal.

As shown in FIGS. 1 and 2, the artificial kidney may comprise or simulate what is known as a Kiil kidney. When simulating the latter the unit 15 may be of compact, transportable size and may for example comprise like upper and lower plates 20a and 20b in face to face assembled relation by removable clamps. The latter may include cross bars 121 and removable fasteners 122, as shown. Referring to FIGS. 2 and 3, the inner faces of the assembled plates are recessed at 30 proximate their opposite ends to receive and retain elastomer pressure pads 31. The latter are dished at 32 to receive and seal against hollow plastic flow distributors 21 located therebetween.

The distributors have tubular terminals 22 projecting from the inlet and outlet ports 23 formed by the unit 15. Fluid pumped at 24 in flexible tubing 25 enters the unit 15 via one flow distributor serving to distribute the fluid via header passage 27 for parallel flow via multiple channels 26 toward header passage 28. From the latter the fluid is collected by the opposite and like "distributor," for passage to flexible tubing 29 via distributor 21 and terminal 22. Unit halves 20a and 20b may be constructed of clear plastic, for demonstration purposes, whereby the flow of blood-simulating red colored liquid in channels 26 may be observed. Such channels simulate the zone of a Kiil kidney wherein the blood is subjected to dialysis.

The invention also contemplates the provision of a support removable from the container 10 to be carried by a patient, together with transparent tubing on the support for passing liquid, as for example simulated blood. In FIGS. 1 and 2 the support with unusual advantage takes the form of a pliant pad 37 carrying straps 38 adapting it to be attached to the arm of a demonstrator or trainee. Tubing stretches 35a and 29a we suitably attached at 39 to the pad, and may be transparent so that the trainee may verify the fact that demonstrator liquid is flowing. Also, it is clear that "connection" of lines 35a and 29a to a patient's artery and vein structure is simulated. A loop 40 may be provided to interconnect tubing stretches 29a and 35a, as shown in FIG. 2, whereby a circuit is formed for liquid to flow between the "patient" and the demonstrator artificial kidney 15. In this regard, pump 24 simulates the "patients" heart.

In FIG. 1, the pump 24 is carried by the container 10 and within elongated housing 42 as shown. That pump may be battery powered, or externally powered via electrical line and plug connection to socket 43, a switch 44 being provided to turn the pump on and off. Indicator light 45 is adapted to glow when the pump is operating. At the opposite end of the housing 42 a liquid reservoir 47 may be provided, to be filled via a capped inlet 48. FIG. 2 shows the reservoir 47 which receives liquid from line 35 and from which the pump 24 takes suction.

The invention contemplates that the demonstrator kidney 15 may be replaced by an actual artificial kidney, as for example as shown at 70 in FIG. 4. The latter comprises a so-called "coil" kidney of known construction. Blood delivered from a patient's vein via line 25 connected to inlet terminal 50 flows through the dializing filter 51 of spiral construction and housed by inner and outer sleeves 52 and 53 as well as end caps 54 and 55. Blood leaves the filter via outlet terminal 56 for return to the patient's artery. Under such conditions, the tubing stretches 29a and 35a may be connected with the patient's artery and vein structure via suitable cannuli.

Under these circumstances should the pump 24 and reservoir 47 not be needed, the line 35 may be directly connected to the inlet 23 of the artificial kidney, line 25 being omitted.

The pad 37 may be stored in space 60 in the container, and standard 18 may be stored within the envelope defined by flap 61, for transportation. If kidney 70 is used it may be stored in space 16.

Accordingly, the invention contemplates the provision of portable dialysis equipment of simple construction and mode of operation.

I claim:

1. Portable apparatus for operating or simulating the operation of artificial kidneys or the like comprising
   a. a portable container adapted to be opened and closed,
   b. an artificial kidney type device carried by the container,
   c. a support removable from the opened container to be carried by a patient, looping transparent tubing on the support for passing artificial blood, and
   d. an artificial blood reservoir and a pump carried by the container and in communication with said device and tubing for maintaining circulation of artificial blood in an endless path within the tubing toward said support and back toward said device.

2. The apparatus of claim 1 wherein said container includes a receptacle and cover openable and closable relative to the receptacle, there being a handle on the container.

3. The apparatus of claim 1 wherein said support comprises a pliant pad and means thereon to connect the pad to the arm of a patient.

4. The apparatus of claim 2 wherein said device is removably carried in the container.

5. The apparatus of claim 4 including a standard in the container for removably supporting said device.

6. The apparatus as defined in claim 5 including a base in the container to support the standard with said device supported thereon.

7. The apparatus as defined in claim 4 wherein the container defines housing means for said reservoir and pump.

8. The apparatus as defined in claim 1 including flexible flow tubing connecting said device in liquid flowing communication with said pump and transparent tubing.

9. The apparatus of claim 1 wherein said device comprises a Kiil unit.

10. The apparatus of claim 9 wherein the Kiil unit has inlet and outlet ports defined by upper and lower body sections, and including flow distributors connected with said flow tubing and clamped between said sections at said inlet and outlet ports.

11. The apparatus as defined in claim 1 wherein said device comprises a coil unit having an enclosed annular filter with vertically spaced inlet and outlet ports.

* * * * *